United States Patent [19]

Poole

[11] Patent Number: 4,554,946

[45] Date of Patent: Nov. 26, 1985

[54] DEVICE TO PREVENT FUEL FLOW FROM A FUEL TANK TO AN ENGINE

[76] Inventor: Michael R. Poole, 4801 Peachtree Rd., Balch Springs, Tex. 75180

[21] Appl. No.: 587,944

[22] Filed: Mar. 9, 1984

[51] Int. Cl.$^4$ ............................................. F16K 35/00
[52] U.S. Cl. ................................. 137/384.2; 137/385; 137/625.41; 251/310
[58] Field of Search ................ 137/385, 384.2, 625.41; 251/310

[56] References Cited

U.S. PATENT DOCUMENTS

| | | | |
|---|---|---|---|
| 1,217,406 | 2/1917 | Burkhardt | 137/384.2 |
| 1,791,914 | 2/1931 | Tomilson | 251/310 |
| 2,580,218 | 12/1951 | Corant | 251/310 |
| 2,881,789 | 4/1959 | Finazzo | 137/384.2 |
| 3,731,703 | 5/1973 | Hubenthal | 137/384.2 |
| 3,792,712 | 2/1974 | Fontona | 137/385 |

FOREIGN PATENT DOCUMENTS 548233 9/1956 Italy ................... 137/384.2

Primary Examiner—A. Michael Chambers
Attorney, Agent, or Firm—Harry C. Post, III

[57] ABSTRACT

A device is used to control the passage of fuel from a fuel tank to an engine. The device comprises a body including a chamber. An inlet member is connected to the body and has an inlet passageway for placing the fuel tank in fluid communication with the chamber. An outlet member is connected to the body and has an outlet passageway for placing the chamber in fluid communication with the motorcycle engine. An element is disposed within the body and movable between a position placing the inlet passageway in fluid communication with the chamber and a position preventing fluid communication between the inlet passageway and the chamber. A lock mechanism is used to secure the element in the position preventing fluid communication between the inlet passageway and chamber to prevent movement of the element to the position placing the inlet passageway in fluid communication with the chamber. Apparatus is disposed within the body for connecting the lock mechanism to the element to move the element when the lock mechanism moves and to prevent movement of the element until the lock mechanism moves.

11 Claims, 3 Drawing Figures

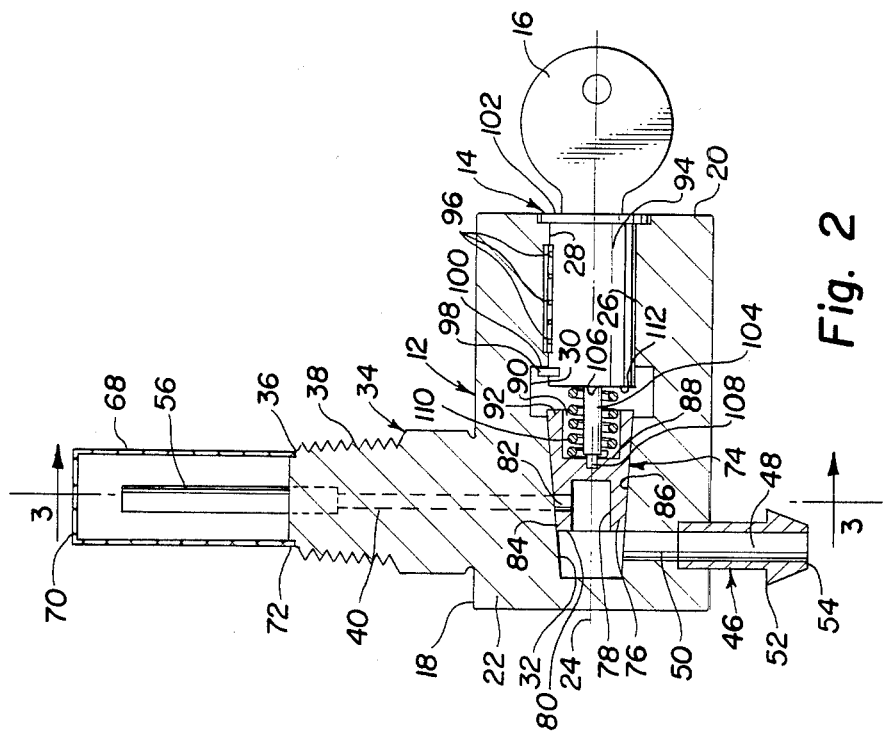
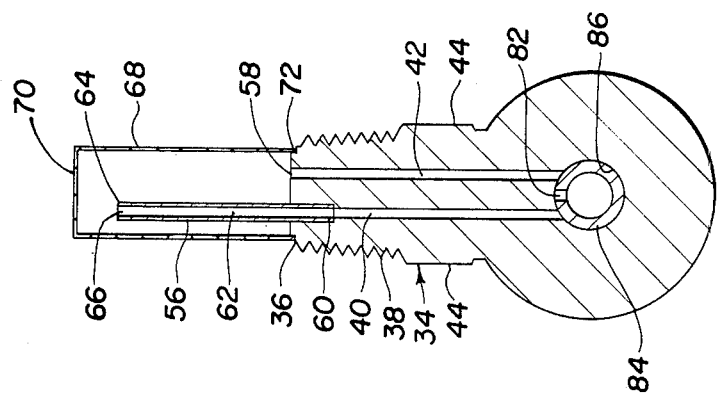

DEVICE TO PREVENT FUEL FLOW FROM A FUEL TANK TO AN ENGINE

It is well known that a large number of motorcycles are stolen each year from the lawful owners. Several devices have been used to discourage such thefts, which generally involve causing the potential thief to spend a period of time before the motorcycle can be moved. One example of this type antitheft device is the apparatus used to lock the front wheel in a turned position to prevent movement of the motorcycle except in a circular path until unlocked. Another example of this type antitheft device employs a chain passed through the spokes of a wheel with the chain then being locked by a padlock. Another example of this type antitheft device employs a special padlock which is passed through the drive chain and then locked in place. To circumvent these devices, thieves have used a torch to heat the lock or chain and a hammer or other device to destroy the lock or chain. After the lock has been removed, it is a simple matter for the thief to remove the motorcycle from the location where the owner left it, such as by riding the motorcycle away. By heating the lock and breaking it, the time spent by an experienced thief is minimal and therefore not much of a deterrent.

Accordingly, it is an object of the present invention to provide apparatus than can not be easily removed from a motorcycle by using heating apparatus or by using a striking instrument on locking apparatus without the possibility of substantial damage to the motorcycle or thief.

Further, it is an object of the present invention to provide apparatus that inhibits a thief from starting the motorcycle engine after the apparatus is forcibly removed from the motorcycle.

Further, it is an object of the present invention to provide apparatus that inhibits any unauthorized use of a vehicle by preventing fuel flow from the vehicle's fuel tank to the vehicle's engine until the apparatus is unlocked.

Further, it is an object of the present invention to provide a motorcycle antitheft device embodying a valving mechanism that uses a surface-to-surface seal to prevent the inadvertant passage of fuel out of the valving mechanism.

In accordance with the invention, a device is used to control the passage of fuel from a fuel tank to an engine. The device comprises a body including a chamber. An inlet member is connected to the body and has an inlet passageway for placing the fuel tank in fluid communication with the chamber. An outlet member is connected to the body and has an outlet passageway for placing the chamber in fluid communication with the motorcycle engine. An element is disposed within the body and movable between a position placing the inlet passageway in fluid communication with the chamber and a position preventing fluid communication between the inlet passageway and the chamber. A lock mechanism is used to secure the element in the position preventing fluid communication between the inlet passageway and chamber to prevent movement of the element to the position placing the inlet passageway in fluid communication with the chamber. Apparatus is disposed within the body for connecting the lock mechanism to the element to move the element when the lock mechanism moves and to prevent movement of the element until the lock mechanism moves.

Other objects and advantages of the invention will become apparent upon reading the following detailed description and upon reference to the drawings, wherein like reference characters are used throughout to designate like parts and in which:

FIG. 2 is a sectional, elevational view of the device shown in FIG. 1, as viewed from the side; and FIG. 3 is a sectional, elevational view of the device shown in FIG. 2, as taken along the lines and viewed in the direction of arrows 3—3.

Figure 1:
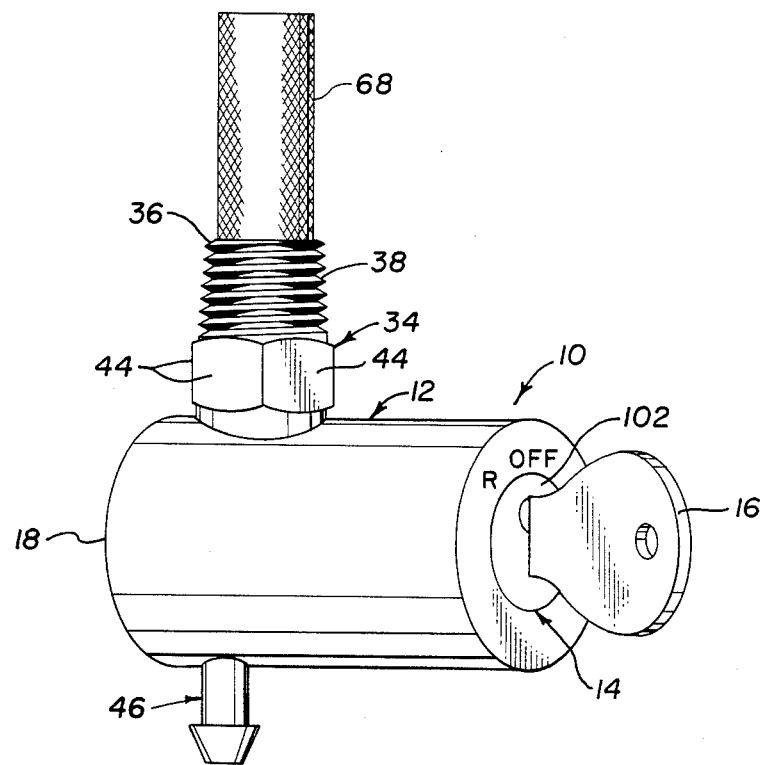
FIG. 1 is a perspective view of a motorcycle antitheft device constructed according to the present invention.

Turning to FIG. 1, there is shown a motorcycle antitheft device 10 constructed according to the present invention to control the passage of fuel from a motorcycle fuel tank (not shown) to a motorcycle engine (not shown). Device 10 comprises valving apparatus 12 to selectively permit and prevent the passage of fuel from the fuel tank to the engine and locking apparatus 14 to prevent movement of valving apparatus 12 when the fuel is prevented from passing to the engine and when a key 16 used with locking apparatus 14 is removed.

An elongated cylindrically shaped body 18 is used with valving apparatus 12 and includes a first end 20 and a second end 22. An axis 24 extends longitudinally between first end 20 and second end 22. Disposed symmetrically around axis 24 is a passageway 26, which extends into body 18 from first end 20 toward second end 22. Passageway 26 has a first section 28 disposed adjacent first end 20, a second section 30 disposed adjacent first section 28 on the side away from first end 20, and a third section 32 forming a chamber disposed adjacent second section 30 on the side nearest second end 22. Second section 30 has a larger diameter than first section 28 to form a shoulder 100 facing toward second end 22.

An inlet member 34 is connected to body 18 and disposed to extend radially away from body 18. Inlet member 34 includes a shoulder 36 with external threads 38 adapted to be threadedly connected to a port in the bottom of the motorcycle fuel tank. A first fuel inlet passageway 40 and a second fuel inlet passageway 42 are provided in inlet member 34 to place the fuel tank in fluid communication with third section 32 of passageway 26 extending into body 18 from first and 20. If desired, a series of flats 44 connected end to end may be provided around the periphery of outlet member 34 to allow the use of a wrench to secure device 10 when mounting to the motorcycle fuel tank.

An outlet member 46 is connected to body 18 and disposed to extend radially away from body 18 in a direction diametrically opposed from the direction of inlet member 34. Outlet member 46 is a tubular extension including a passageway 48 in fluid communication with a port 50 in body 18 leading to third section 32 of passageway 26. A lip 52 is provided on the free or outboard end 54 for securing a tube (not shown) in fluid communication with the motorcycle engine.

A tubular member 56 is used to raise the intake port of first fuel inlet passageway 40 to a higher elevation than the intake port 58 of second fuel inlet passageway 42 when inlet member 34 is connected to the bottom of a motorcycle tank. Tubular member 56 is a pipe-like element having one end 60 connected to outlet member 46 with the passageway 62 through the pipe-like element in fluid communication with first inlet passageway 40 and the other end 64 forming intake port 66 for first inlet passageway 40 disposed at an elevation above intake port 58 of second inlet passageway 42 when inlet member 34 is connected to the bottom of the motorcycle fuel tank.

To filter solid foreign matter from the fuel prior to passage of the fuel into first inlet passageway 40 and second inlet passageway 42, a screen 68 may be used. Screen 68 has an elongated tubular shape with a first end 70 being closed and a second end 72 being open. End 72 is attached to shoulder 36 of inlet member 34 to close the open end.

Rotatably disposed within valve body 18 is a valve element 74, which selectively permits and prevents fluid communication between inlet passageways 40 or 42 and outlet passageway 48. Valve element 74 has the shape of a truncated cone with side walls 76 to prevent fluid communication between fuel inlet passageways 40 and 42 and outlet passageway 48 formed by a pocket 78 extending inwardly from truncated end 80. A port 82 extends through side walls 76 to selectively place first fuel inlet passageway 40 in fluid communication with outlet passageway 48 and second fuel inlet passageway 42 in fluid communication with outlet passageway 48. Tapered shoulders 84 engage tapered surfaces 86 in third section 32 of passageway 26 to provide a seal and prevent fluid from flowing between valve element 74 and body 18. A base shoulder 88 is formed by a pocket 90 extending inwardly from base 92 of valve element 74.

Locking apparatus 14 is used to secure valve element 74 in the position preventing fluid communication between inlet passageways 40 and 42 and third section 32 of passageway 26 and to prevent movement of valve element 74 to the position placing inlet passageways 40 and 42 in fluid communication with third section 32 of passageway 26. Locking apparatus 14 includes a cylinder lock plug 94 disposed within first section 28 of passageway 26 for rotatable movement around axis 24. A number of lock pins 96 are provided in lock plug 94 to move between a withdrawn position, as shown in FIG. 2, to allow rotating movement of plug 94 when key 16 is inserted into lock plug 94 and an extended position to engage a shoulder on body 18 and thereby prevent rotatable movement when key 16 is removed from lock plug 94. A latching member 98 is connected to plug 94 to extend into second section 30 of passageway 26 to connect lock plug 94 to body 18 by abutting against shoulder 100 formed between first section 28 and second section 30 of passageway 26. A cover 102 is provided over lock plug 94 to prevent access to plug 94.

To move valve element 74 rotatably about axis 24 when lock plug 94 is rotated by movement of key 16 and to prevent movement of valve element 74 until lock plug 94 is rotated by movement of key 16, move preventing apparatus 104 is provided. Apparatus 104 includes a spindle rod with one end 106 attached to lock plug 94 and another end 108 attached to valve element 74.

Valve element 74 is urged by apparatus 110 toward second end 22 of body 18 and into engagement with third section 32 of passageway 26 such that tapered shoulders 84 are in secure engagement with tapered surfaces 86 and thereby provide an enhanced surface-to-surface seal. Urging apparatus 110 is a coil spring disposed around spindle 106 which extends between end 112 of lock plug 94 and base shoulder 88 of valve element 74.

In operation, device 10 is connected to a motorcycle tank in place of the normal fuel valve by screwing threads 38 into the matching internal threads provided around the opening through the bottom of a motorcycle fuel tank. Device 10 is tightened by using a wrench to grip flats 44 and rotate device 10 relative to the motorcycle. Since the opening leading into the motorcycle fuel tank is in the bottom of such tank, intake port 66 will be at a higher elevation than intake port 58, as generally represented in FIG. 3. A tube running to the carburetor of the motorcycle engine is then slipped over tubular outlet member 46 and secured thereto by use of a conventional clamping device which is disposed around passageway 48 between body 18 and lip 52 thereby placing the chamber formed by third section 32 and valve element 74 in fluid communication with the motorcycle engine. Key 16 is then inserted into lock plug 94 allowing pins 96 to move to the disengaged position with body 18 and rotated clockwise around axis 24 to a position represented by the word ON, hidden by key 16 in FIG. 1, wherein port 82 is aligned with first fuel inlet passageway 40 to place this inlet passageway in fluid communication with the chamber in body 18. When the fuel level in the motorcycle fuel tank drops below intake port 66 during normal driving operations, key 16 is rotated counterclockwise around axis 24 to a position represented by the letter R, as seen in FIG. 1, wherein port 82 is aligned with second fuel inlet passageway 42 to place this inlet passageway in fluid communication with the chamber in body 18. When the motorcycle is no longer being used by the owner, key 16 is moved, either from the ON or R position, to a position represented by the word OFF, as seen in FIG. 1, wherein port 82 is positioned between first fuel inlet passageway 40 and second fuel inlet passageway 42 such that side walls 76 of valve element 74 prevent fluid communication with the chamber in body 18. Key 16 is removed from lock plug 94 and pins 96 move into engagement with body 18 which prevents valve element 74 from moving and thereby prevents fuel from passing from the motorcycle fuel tank to the motorcycle engine.

The invention having been described, what is claimed is:

1. A device to control the passage of fuel from a fuel tank to an engine, comprising: an elongated body including first and second ends and a passageway extending from the first end toward the second end, the passageway having first, second and third sections, the third section forming a chamber and having surfaces tapering toward one another when moving toward the second end; an inlet member connected to said body including an inlet passageway for placing the fuel tank in fluid communication with the chamber; an outlet member connected to said body including an outlet passageway for placing the chamber in fluid communication with the engine; an element disposed within said body and movable between a position placing the inlet passageway in fluid communication with the chamber and a position preventing fluid communication between the inlet passageway and the chamber, said element having tapered shoulders adapted to engage the tapering surfaces in the third section to form a surface-to-surface seal which prevents fluid flow between the valve element and the body, said element being in the the shape of a truncated cone with side walls to prevent fluid communication between the passageways in the inlet and outlet members formed by a pocket extending inwardly from the truncated end of said element, a port extending through the side walls into the pocket for placing the inlet passageway in fluid communication with the outlet passageway in the outlet member, said element including a base shoulder formed by a pocket extending inwardly from the base of said element; means for urging said element toward the second end of said body and into engagement with the third section of the passageway extending into said body; locking means disposed in the first section of the passageway extending into said body for securing said element in the position preventing fluid communication between the inlet passageway and chamber and for preventing movement of said element to the position placing the inlet passageway in fluid communication with the chamber; said means for urging including a spring disposed between an end of said locking means and the base shoulder in said element; and means disposed within said body for connecting said locking means to said element to move said element when said locking means moves and to prevent movement of said element until said locking means moves.

2. The device set forth in claim 1, wherein said inlet member includes a shoulder with external threads for threadedly connecting to the fuel tank, a first inlet passageway placing the fuel tank in fluid communication with the chamber and a second inlet passageway placing the fuel tank in fluid communication with the chamber; and including means for raising an intake port of the first inlet passageway to a higher elevation than an intake port of the second passageway when the inlet member is connected to the fuel tank.

3. The device set forth in claim 2, wherein said intake port raising means includes a pipe-like element having one end connected to the inlet member with the passage through the pipe-like element in fluid communication with the first inlet passageway and the other end disposed at an elevation above the intake port of the second inlet passageway when the inlet member is connected to the motorcycle fuel tank.

4. The device set forth in claim 1, further including a screen for filtering solid foreign matter from the fuel prior to passage of the fuel into the inlet passageway connected to said inlet member.

5. The device set forth in claim 4, wherein said screen includes an elongated tubular shape with first and second ends, the first end being closed and the second end being attached to said inlet member.

6. The device set forth in claim 1, wherein said locking means includes a lock plug having a number of pins disposed to move between a withdrawn position to allow movement of said plug when a key is inserted into the lock plug and an extended position to prevent movement when the key is removed from the lock plug.

7. The device set forth in claim 6, wherein said locking means includes a latching member to secure the lock plug to the body disposed to extend into the second section of the passageway extending into the body.

8. The device set forth in claim 1, wherein said connecting means includes a spindle with one end attached to said locking means and another end attached to the valve element.

9. The device set forth in claim 8, including said means for urging the valve element toward the second end of said body into engagement with the third section of the passageway extending into said body having a coil spring disposed around the spindle and extending between said locking means and said element.

10. The device set forth in claim 1, wherein said outlet member includes a tubular extension with a passageway in fluid communication with a port in said body leading to the chamber and a lip provided on an outboard end of the tubular extension for securing a tube disposed in fluid communication with the motorcycle engine.

11. A motocycle antitheft device to control the passage of fuel from a motorcycle fuel tank to a motorcycle engine, comprising: an elongated cylindrically shaped body, including, a first end, a second end, an axis of symmetry extending between the first and second ends and a passageway disposed symmetrically around the axis extending inwardly from the first end toward the second end and having a first section disposed adjacent the first end, a second section disposed adjacent the first section on the side away from the first end and a third section disposed adjacent the second section on the side nearest the second end; an inlet member connected to said body and disposed to extend radially away from said body, including, a shoulder with external threads adapted to be threadedly connected to the fuel tank, a first fuel inlet passageway placing the fuel tank in fluid communication with the third section of the passageway extending into said body and a second fuel inlet passageway placing the fuel tank in fluid communication with the third section of the passageway extending into said body; an outlet member connected to said body and disposed to extend radially away from said body in a direction diametrically opposed from said inlet member, including, a tubular extension having a passageway in fluid communication with a port in said body leading to the third section of the passageway extending into said body and a lip provided on an outboard end of the tubular extension for securing a tube disposed in fluid communication with the motorcycle engine; a tubular member for raising an intake port into the first inlet passageway to a higher elevation than an intake port into the second inlet passageway when said inlet member is connected to the motorcycle fuel tank, including, a pipe-like element having one end connected to said inlet member with the passage through said pipe-like element in fluid communication with the first inlet passageway and the other end disposed at an elevation above the intake port of the second inlet passageway when said inlet member is connected to the motorcycle fuel tank; a screen for filtering solid foreign matter from the fuel prior to passage of the fuel into the first and second inlet passageways and having an elongated tubular shape with first and second ends, the first end being closed and the second end being attached to the shoulder of said inlet member; a valve element adapted to selectively permit and prevent fluid communication between the inlet and outlet passageways being rotatably disposed within said body and having the shape of a truncated cone with side walls to prevent fluid communication between the passageways in said inlet and outlet members formed by a pocket extending inwardly from the truncated end of the valve element, a port extending through the side walls to selectively place the inlet passageways in said inlet member in fluid communication with the outlet passageway in said outlet member, tapered shoulders to engage tapered surfaces in the third section of the passageway extending into said body for providing a surface engaging seal to prevent fluid from flowing between said valve element and said body and a base shoulder formed by a pocket extending inwardly from the base of the valve element; a cylinder lock plug disposed in the first section of the passageway extending into said body having a number of pins disposed to move between a withdrawn position to allow movement of said plug when a key is inserted into the lock plug and an extended position to prevent movement when the key is removed from the lock plug and a latching member disposed to extend into the second section of the passageway extending into said body to connect said lock plug to said body; means for moving the valve element when the lock plug moves while preventing movement until the cylinder lock plug moves including a spindle with one end attached to the lock plug and another end attached to the valve element; and means for urging the valve element toward the second end of said body and into engagement with the third section of the passageway extending into said body having a coil spring disposed around the spindle and extending between an end of said lock plug and the base shoulder in said valve element.

* * * * *